United States Patent
Nevins

(10) Patent No.: US 9,356,458 B2
(45) Date of Patent: May 31, 2016

(54) SWITCH-CONTROLLED ENERGY CYCLING APPARATUS

(71) Applicant: Paul M. Nevins, Seymour, TN (US)

(72) Inventor: Paul M. Nevins, Seymour, TN (US)

(\*) Notice: Subject to any disclaimer, the term of this patent is extended or adjusted under 35 U.S.C. 154(b) by 423 days.

(21) Appl. No.: 14/093,595

(22) Filed: Dec. 2, 2013

(65) Prior Publication Data

US 2014/0091749 A1   Apr. 3, 2014

Related U.S. Application Data

(60) Provisional application No. 61/733,113, filed on Dec. 4, 2012.

(51) Int. Cl.
*H02J 7/00* (2006.01)
*H02J 7/34* (2006.01)

(52) U.S. Cl.
CPC ............. *H02J 7/0054* (2013.01); *H02J 7/34* (2013.01); *H02J 7/345* (2013.01)

(58) Field of Classification Search
CPC ..... H02J 7/0013; H02J 7/0073; H02J 7/0091; H02J 7/0054; H02J 7/1423; H02J 7/0068; H02J 7/0063; H02J 7/0065; H02J 2007/0067; H02J 7/008; H02J 7/0081; H02J 7/22; H02J 7/0031; Y02E 60/12; H01M 10/44; H01M 10/46; Y02T 10/7005; Y02T 90/121
USPC ............ 320/103, 125, 128, 135, 138, 160
See application file for complete search history.

(56) References Cited

U.S. PATENT DOCUMENTS

| 2005/0001593 A1* | 1/2005 | Kawasumi | H02J 7/0013 320/132 |
| 2006/0158156 A1* | 7/2006 | Gamboa | H02J 7/0031 320/141 |

\* cited by examiner

*Primary Examiner* — Richard Isla Rodas
*Assistant Examiner* — Mohammed J Sharief
(74) *Attorney, Agent, or Firm* — Luedeka Neely Group, P.C.

(57) ABSTRACT

A switch-controlled energy cycling apparatus having two or more energy storage units; a control board that controls the status of each of the energy storage units and selectively cycles each between an inactive state, an active-discharging state, providing energy to a load outside of the apparatus, and an active-recharging state; and at least one sensor configured to monitor the apparatus and, at a first time period, sets the first energy storage unit to the active-discharging state and the second energy storage unit to the active-recharging state, where energy is also delivered to and recharges the second energy storage unit. At a second time period, the board automatically and in response to receiving a signal sent from the sensor indicating that one of the sensed values has reached a preprogrammed set point, cycles the charging state of the first and second energy storage units to different charging states according to a looping pattern.

20 Claims, 3 Drawing Sheets

SWITCH-CONTROLLED ENERGY CYCLING APPARATUS

CROSS REFERENCE TO RELATED APPLICATION

This application claims the benefit of U.S. Provisional Application Ser. No. 61/733,113, which was filed on Dec. 4, 2012, and is incorporated herein by reference in its entirety.

FIELD

This invention relates to the field of energy apparatus. In particular, this invention relates to a switch-controlled energy cycling apparatus that shifts energy use between energy sources while simultaneously providing useful energy external to the apparatus.

BACKGROUND AND SUMMARY

Batteries have been used for many years as a reliable source of energy to power in many different applications, including portable electronics, vehicles, etc. One advantage of batteries is that they are portable and can, therefore, provide a source of energy in locations where energy would otherwise not be available. Another benefit of batteries, such as lead-acid batteries, is that they can be discharged and recharged many times. On the other hand, a common problem in the use of energy sources generally and batteries in particular is that they usually become hot during use. Generally, any energy source that generates heat, either in the discharging or recharging process, will be less efficient than an energy source that does not generate as much heat. One reason for this is that the energy is being used to make that heat instead of for its useful, intended purpose.

Additionally, a disadvantage of some rechargeable batteries is known as the memory effect or the lazy battery effect, which causes the batteries recharge performance to degrade over time by gradually reducing the maximum energy capacity. This is caused when batteries are repeatedly recharged after only being partially discharged. The battery is said to "remember" the smaller capacity. A similar problem known as voltage depression occurs when batteries are overcharged repeatedly and results in the peak voltage of the battery dropping more quickly than normal, even though the total energy remains the same. Thus, it appears that the battery is drained more quickly than normal or that it is not holding a full charge.

Accordingly, there is a need for an energy apparatus that avoids the above-described problems. In view of the foregoing, one embodiment of the disclosure provides an apparatus and method of providing energy with an energy cycling apparatus. The apparatus includes two or more energy storage units, including at least a first energy storage unit and a second energy storage unit, each of the two or more storage units are connected to a ground and are capable of being activated, deactivated, discharged and recharged independently from one another. In certain embodiments, each of the two or more energy storage units comprises a battery or a capacitor.

The apparatus also includes a control board that is connected to each of the two or more energy storage units. The control board is operable for controlling an operational status of each of the two or more energy storage units and of selectively cycling each of the two or more energy storage units between an inactive state, an active-discharging state, where at least a first portion of the energy being discharged is provided for use by a load outside of the apparatus, and an active-recharging state.

The apparatus also includes at least one sensor that is configured to monitor at least one of the following measured values: total remaining charge in each of the two or more energy storage units, the percentage of full charge remaining in each of the of the two or more energy storage units, the temperature of each of the two or more energy storage units, the amperage of each of the two or more energy storage units, the voltage of each of the two or more energy storage units, and a malfunction in the apparatus. The sensor is configured to return the sensed value to the control board as a signal.

The control board is programmed to, at a first time period, set the first energy storage unit to the active-discharging state and the second energy storage unit to the active-recharging state, wherein a second portion of the energy being discharged from the first energy storage unit is delivered to and recharges the second energy storage unit. At a second time period following the first time period, the control board automatically and in response to receiving a signal at the control board sent from the at least one sensor indicating that the at least one sensed values has reached the preprogrammed set point, cycles the charging state of the first and second energy storage units to different charging states according to a looping pattern.

In certain embodiments, the apparatus also includes a third energy storage unit. The third energy storage unit may be set to the inactive charging state at the first time period.

In certain embodiments, the looping pattern is manually programmed. In other embodiments, the apparatus automatically determines the looping pattern. The looping pattern may cycle each of the energy sources from the active-discharge state directly to the active-recharge state. Alternatively, the looping pattern may include a cool off period and cycle each of the energy sources to the inactive state for at least one cycle between transitioning from the active-discharge state to the active-recharge state or vice versa. In certain preferred embodiments, when the apparatus detects a malfunctioning energy source, the looping pattern is automatically altered to remove the malfunctioning energy source from that pattern. In other embodiments, the looping pattern is automatically updated depending on the sensed values or the load.

Finally, in other embodiments, in response to a signal indicating that the temperature of one of the two or more energy storage units has reached the preprogrammed set point, the apparatus automatically includes a cool off period in the looping pattern, where each of the energy sources is cycled to the inactive state for at least one cycle between transitioning from the active-discharge state to the active-recharge state or vice versa.

BRIEF DESCRIPTION OF THE DRAWINGS

Further advantages of the invention are apparent by reference to the detailed description in conjunction with the figures, wherein elements are not to scale so as to more clearly show the details, wherein like reference numbers indicate like elements throughout the several views, and wherein.

DETAILED DESCRIPTION

Described herein are techniques and apparatus for switch-controlled energy cycling apparatus. In the detailed description that follows, for the purposes of explanation, examples and specific details may be set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein.

Figure 1:
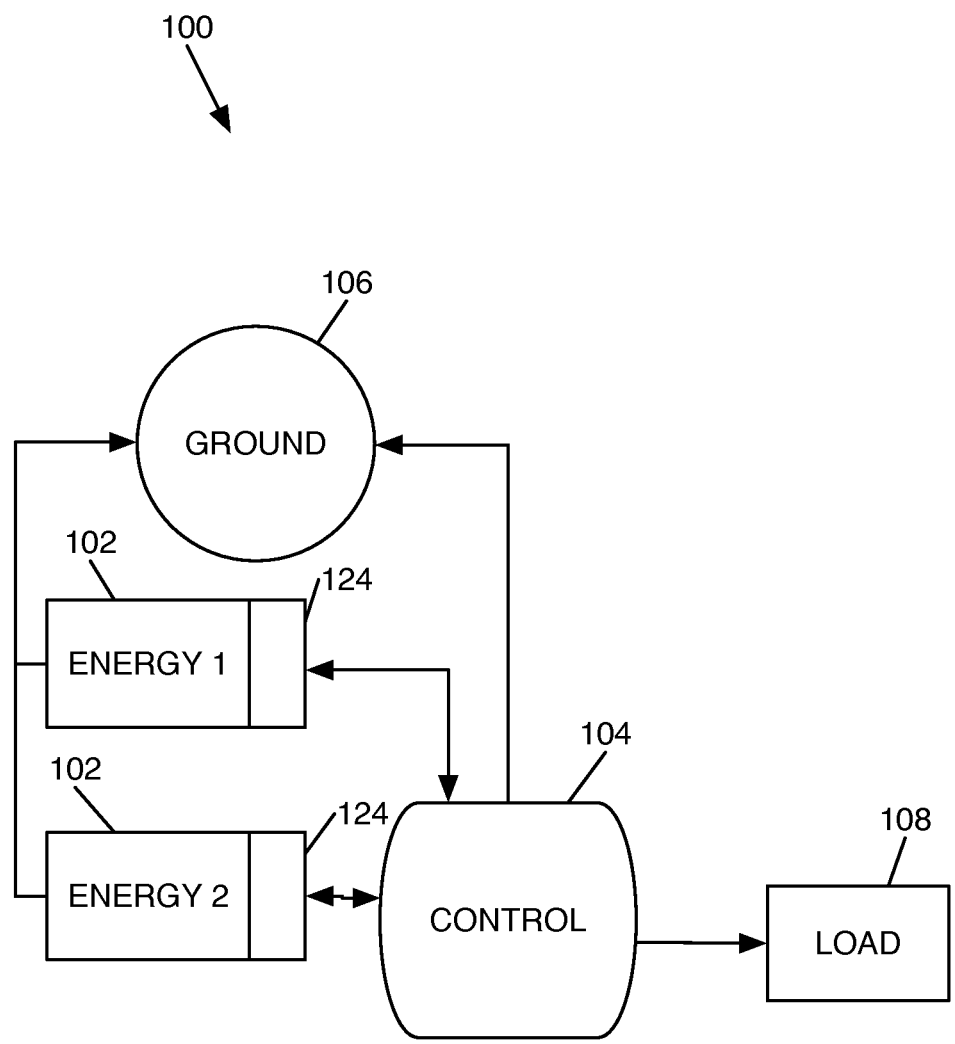
FIG. 1 is a block diagram depicting a switch-controlled energy cycling apparatus according to a first embodiment of the present invention.

The benefits and advantages of a switch-controlled energy cycling apparatus may be further understood by reference to the drawings wherein like numerals indicate like features in the drawings. Turning now to the drawings in greater detail and considering first FIG. 1, there is provided a block diagram illustrating a simple switch-controlled energy cycling apparatus 100 according to one embodiment of the present invention. In general, this apparatus 100 includes two or more energy storage units or energy sources 102, which may be used to provide useful energy and that are capable of being recharged. Suitable energy sources 102 may include, for example, batteries or capacitors, superconducting magnetic energy storage systems or supercapacitors. The apparatus 100 may include more than two energy sources 102 and, preferably includes a plurality of energy sources. As discussed below, the apparatus 100 also includes a control box 104, a ground 106, and a load 108.

The energy sources 102 may be active or inactive ("inactive energy sources"). If an energy source 102 is active, it is either being discharged by supplying energy ("active-discharging energy sources") or being recharged by receiving energy ("active-recharging energy sources"). Energy flowing from an active-discharging energy source 102 may be divided between providing useable energy outside of the apparatus 100 to the load 108, for example, and being returned to the active-recharging energy sources. The proportion of energy provided as useful energy and for recharging energy sources may be varied according to the needs of the apparatus 100. For example, if a heavy load 108 is drawing energy, a larger proportion of energy may be provided as useful energy and lesser amount provided to recharging.

Energy sources 102 may cycle between the inactive state, the active-discharging state and the active-recharging state throughout the operation of this apparatus 100. For example, as shown in the Table below, at a first time period (T1), if a first energy source 102 (Energy 1) is in the active-discharging state (i.e., supplying energy), a portion of the energy may be directed outside of the apparatus 100 (e.g., for use with a hair dryer) and the remaining portion of the energy may be used to charge a second energy source (Energy 2), which is in the active-recharging state. Later, at second time period (T2), Energy 1 may cycle to the active-recharging state and Energy 2 may cycle to the active-discharging state.

EXAMPLE 1

|  | ENERGY 1 | ENERGY 2 |
| --- | --- | --- |
| T1 | Active: Discharging | Active: Recharging |
| T2 | Active: Recharging | Active: Discharging |

Generally, there is at least one active-recharging energy source 102 and at least one active-discharging energy source. However, multiple energy sources 102 can be inactive, discharging or recharging at the same time.

Each of the energy sources 102 is connected to the control board 104, which manages the cycling process described above and determines the state of each of the energy sources 102 and determines when and how those states change. The control board 104 may be programmed to cycle between energy sources 102 after certain events have occurred, after a certain amount of time has elapsed or the apparatus 100 has reached a certain state. For example, the apparatus 100 may include one or more sensors 124, such as ammeters, voltmeters, or temperature sensors and the logic board 104 may be programmed to cycle between energy sources 102 once the remaining charge of any active energy source has reached a certain preprogrammed voltage or amperage level or limit or percentage, including either a minimum or a maximum value. For example, if the voltage in any energy source 102 exceeds or falls below a specified limit, the control board 104 may instruct the apparatus to cycle the energy sources. Alternatively, the apparatus 100 may include one or more timers and be programmed to cycle between energy sources 102 once a preset amount of time has elapsed since the previous cycle took place or at a specified time of day.

Alternatively, the apparatus 100 may include one or more temperature sensors 124 and be configured to cycle between energy sources 102 if it detects a problem, such as a malfunctioning energy storage unit 102 causing unexpected high temperatures, or a potential malfunction or degradation of the apparatus's efficiency, which may be indicated by temperatures that are higher or lower than limits, representing the expecting operating range. For example, many batteries function best at room temperature and charging or discharging a battery in extreme temperatures, either hot or cold temperatures, typically degrades performance or longevity of the battery. While operating a particular battery at elevated temperatures temporarily may improve the battery's performance, these conditions may shorten the useful life of the battery if increased temperatures are maintained for an extended period of time. On the other hand, cold temperatures may diminish batteries' capacity. Accordingly, one advantage of the apparatus 100 is that maximum and minimum temperature limits may be set in order maximize the efficiency and useful service life of the energy source 102.

Additionally, the rate at which a battery is charged or discharged may affect its capacity and life. Typically, batteries that are discharged at a moderate rate will deliver more energy over the course of its life than those discharged at a high rate. Accordingly, in certain embodiments, the apparatus 100 may be used to vary the charge and discharge rates of the energy sources 102 in order to optimize their capacity and life.

Figure 2:
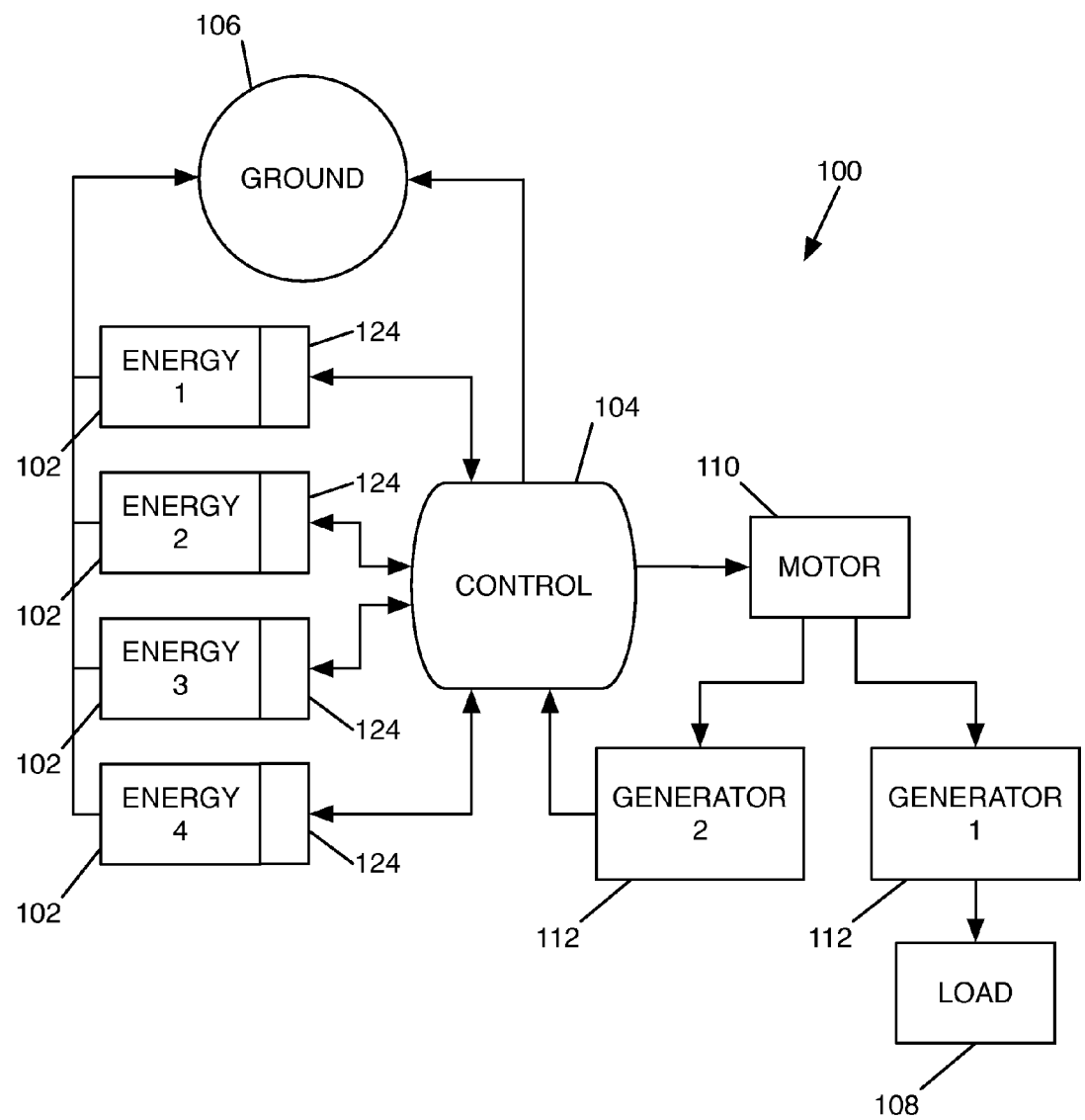
FIG. 2 is a block diagram depicting a switch-controlled energy cycling apparatus according to a second embodiment of the present invention.

One way for the cycling process to occur in this apparatus 100 is through the use of a looping cycling pattern, where the apparatus 100 selectively activates, discharges, charges, and then deactivates each of the energy sources 102 in turn and in a looping fashion. For example, the apparatus 100 shown in FIG. 2 illustrates a slightly more involved apparatus that includes a total of four energy sources 102 (i.e., Energy 1, Energy 2, Energy 3 and Energy 4). Using the looping cycling pattern described above, each of the four energy sources 102 are cycled through inactive and active states in turn. For instance, as shown in the Table below, when the apparatus 100 is initially activated, at time T1, Energy 2 may be in the active-discharge state such that it provides useable energy outside of the apparatus and also to Energy 1, which is in the active-recharge mode. At this stage of the example, Energy 3 and Energy 4 may be in the inactive state, as shown, or they may also be in one of the active states. At a second time period, T2, the control board 104 causes the active and inactive energy sources 102 to cycle. Now, Energy 3 is in the active-discharge state and Energy 2 is in the active-recharge state. The process continues in times T3 and T4, as shown, and then the process repeats according to the looping pattern.

EXAMPLE 2

|    | ENERGY 1          | ENERGY 2           | ENERGY 3           | ENERGY 4           |
|----|-------------------|--------------------|--------------------|--------------------|
| T1 | Active: Recharging | Active: Discharging | Inactive           | Inactive           |
| T2 | Inactive          | Active: Recharging  | Active: Discharging | Inactive           |
| T3 | Inactive          | Inactive           | Active: Recharging  | Active: Discharging |
| T4 | Active: Discharging | Inactive          | Inactive           | Active: Recharging  |

Another advantage of this apparatus 100 is that it can automatically detect and respond to issues that may arise throughout its operation. For example, if an energy source 102 malfunctions, such as running too long or at too high of a temperature, the apparatus 100 may be programmed to deactivate the energy source and to remove it from the looping pattern. In that case, the apparatus 100 would simply skip over the inactive energy source 102 automatically and without interrupting the operation of the apparatus. For example, as shown in the Table below, if Energy 2 malfunctions, it would be deactivated. This feature may be particularly useful for maintaining the apparatus 100, where storage units 102 must be repaired or removed from the apparatus, without causing an interruption in the performance of the apparatus. Additionally, since the units 102 operate separately, uncovering a defective unit would be simpler than in an apparatus where multiple units were operating together at the same time.

EXAMPLE 3

|    | ENERGY 1          | ENERGY 2 (Malfunctioning) | ENERGY 3           | ENERGY 4           |
|----|-------------------|---------------------------|--------------------|--------------------|
| T1 | Active: Recharging |                          | Active: Discharging | Inactive           |
| T2 | Inactive          |                          | Active: Recharging  | Active: Discharging |
| T3 | Active: Discharging |                        | Inactive           | Active: Recharging  |

Another advantage of this apparatus 100 is that it can be programmed to avoid some of the inefficiencies of other energy apparatus described above in order to extend the life and the capacity of the energy sources 102. For example, the apparatus 10 may be programmed to reduce and control the temperature of each of the energy sources 102 through the cycling pattern employed. As shown in the Table below, in certain embodiments, energy sources 102 may become inactive for a period of time following the active-discharging state and before the active-recharging state. This is advantageous because it provides time for the inactive energy source 102 to cool, which will improve the efficiency and life of the energy source, as discussed above.

EXAMPLE 4

|    | ENERGY 1          | ENERGY 2           | ENERGY 3           | ENERGY 4           |
|----|-------------------|--------------------|--------------------|--------------------|
| T1 | Active: Recharging | Inactive          | Active: Discharging | Inactive           |
| T2 | Inactive          | Active: Recharging | Inactive           | Active: Discharging |
| T3 | Active: Discharging | Inactive         | Active: Recharging  | Inactive           |
| T4 | Inactive          | Active: Discharging | Inactive         | Active: Recharging  |

As mentioned before, energy sources 102 often become hot during discharge as well as recharge. If an energy source 102 is immediately recharged after being discharged, it is likely to have a high temperature before the recharging process begins. By allowing the energy source 102 to first cool before the recharge process begins, the recharge process will become more efficient and effective. Accordingly, in certain embodiments, there is a cool off phase between the discharge and recharge stages. The active-recharging energy source 102 and the active-discharging energy source are more than one time period removed from one another in order to lengthen the amount of time between the discharge and recharge states, which provides additional time for the energy sources 102 to cool. One advantage of having an apparatus 100 with a plurality of energy sources 102 is that the inactive period can be extended to multiple time periods, providing an even greater amount of time for cooling.

The apparatus 100 may also be programmed to vary its looping patterns automatically depending on the needs (i.e., load) and conditions of the apparatus. For example, if the apparatus 100 is operating under a normal load, it may utilize the looping patterns shown in Example 2. Later, if more energy is required, the apparatus 100 may activate additional or all energy sources 102 and use the looping pattern similar to the one shown in Example 1. If less energy is required (such as at night or other times when activity levels are low) or the apparatus 100 is being maintained, etc., the apparatus may deactivate and skip certain energy sources 102 altogether, such as shown in Example 3. Finally, if the apparatus 100 senses that the temperature is too high, it may switch to a pattern similar to that shown in Example 4.

With continued reference to FIG. 2, a portion of the flow of energy from Energy 2 is preferably directed by the control board 104 to a motor 110 that is connected to the board, such as a DC-powered motor, which converts the electrical energy from Energy 2 into mechanical energy. That motor 110 may then simultaneously turn two generators 112 (Generator 1 and Generator 2), thereby dividing the energy and converting it back into electrical energy. Energy from Generator 1 is directed to a load 108, where it can be used to power devices that are outside of the apparatus 100. Energy from Generator 2 is directed back through the control board 104 to Energy 1 in order to recharge that energy source 102.

Once the apparatus 100 reaches the specified set point, which may be a particular minimum voltage or percent charge in Energy 1 or Energy 2, or a specified amount of time, the control board 104 cycles the apparatus. Now, Energy 3 may be in the active-discharge state and the now-discharged Energy 2 is in the active-recharge state. Energy 1 and Energy 4 may be in the inactive state. Thereafter, the apparatus 100 continues to cycle in this manner.

Figure 3:
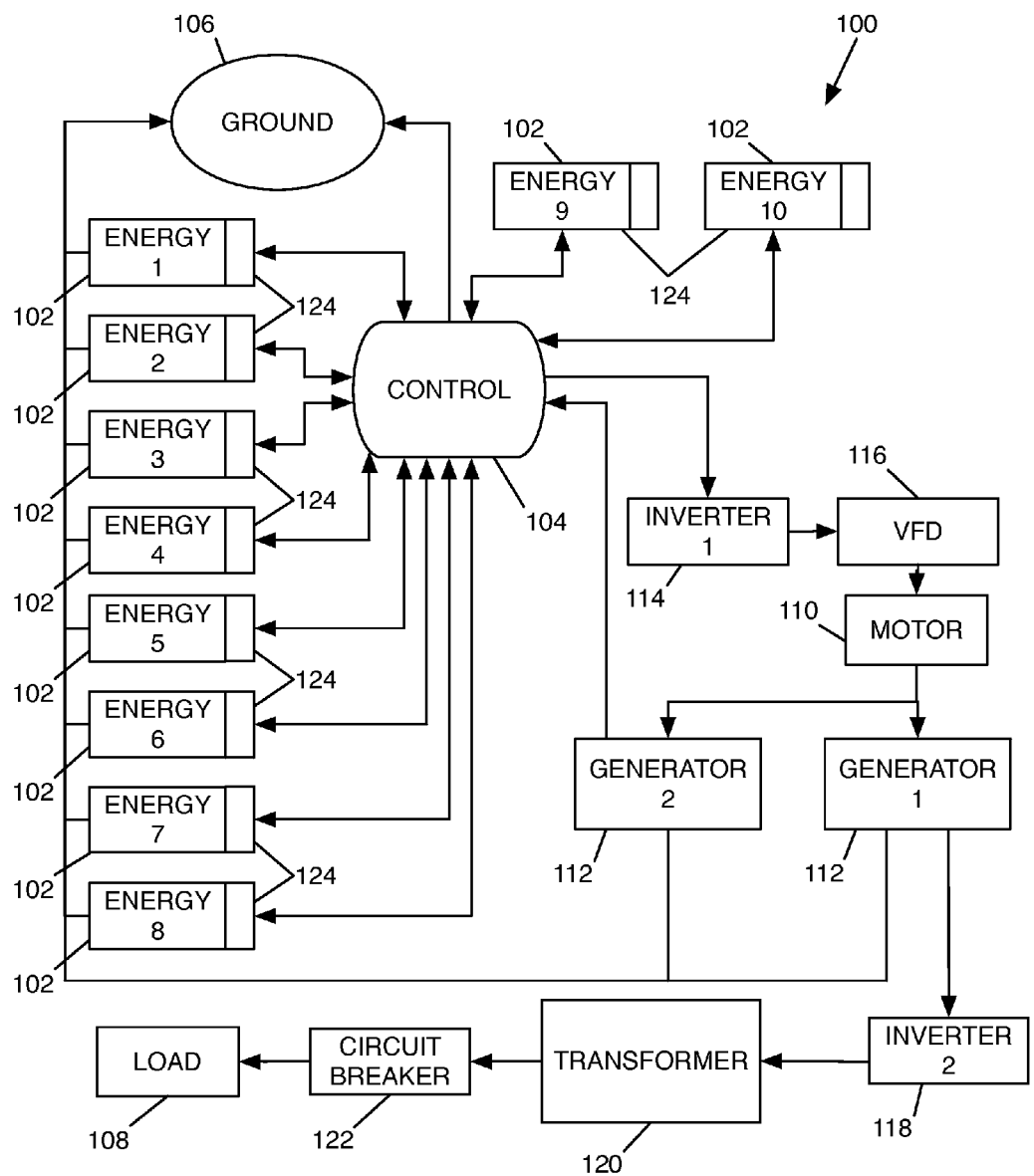
FIG. 3 is a block diagram depicting a switch-controlled energy cycling apparatus according to a third embodiment of the present invention.

FIG. 3 provides a slightly more involved apparatus 100 that further includes a plurality of energy sources (Energy 1 thru Energy 10), a first inverter 114, a second inverter 118, a variable frequency drive (VFD) 116, a transformer 120, and a circuit breaker 122. The primary differences in this embodiment from the previous embodiment are the inclusion of additional energy sources 102 and the ability for this apparatus to convert between alternating current (AC) and direct current (DC).

When the apparatus 100 is activated, the logic board 104 draws direct current from Energy 2, which is then supplied to the first inverter 114 (Inverter 1), which, in this example, is a 24-volt DC to 220-volt AC power inverter. Inverter 1 then provides 220 volts AC power to the VFD 116, which, in turn, provides power to the motor 110. The motor 110 in this case is a 10 hp 220-volt AC motor. The speed of the motor 110 is determined by the VFD 116, which enables an operator to vary the frequency of the motor in order to optimize voltage and work output based on the speed of the motor. As before, the DC-powered motor converts the electrical energy from Energy 2 into mechanical energy. The mechanical energy simultaneously turns two generators 112 (Generator 1 and Generator 2), thereby dividing the energy and converting it back into electrical energy. In certain embodiments, the generators 112 may be replaced with permanent magnet alternators. The generators 112 spin at a rate of one-to-one with the motor 110. In this example, the generators have a rated output of around 126 amps and 50-volts DC at 5,000 RPM.

From there, power from Generator 1 is delivered to a second inverter 118 (Inverter 2), which is also a 24-volt DC to 220-volt AC power inverter. A transformer 120 then lowers the voltage of the electricity from 220 volts to 110 volts, which is then fed through a circuit breaker 122. The breaker 122 provides useable power at 110 volts at 30 amps maximum to a load 108, where it may be used by devices outside of the apparatus 100. At the same time, power from Generator 2 is directed back through the control board 104 to Energy 1 in order to recharge that energy source 102.

Once the apparatus 100 reaches the specified set points, as described earlier, the control board 104 cycles the apparatus. This process continues until each energy source 102 has gone through the entire cycle and then the entire cycle is repeated.

The previously described embodiments of the present disclosure have many advantages. The foregoing description of preferred embodiments have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention.

What is claimed is:

1. An energy cycling apparatus comprising:
    two or more energy storage units, including at least a first energy storage unit and a second energy storage unit, each of the two or more storage units connected to a ground and capable of being activated, deactivated, discharged and recharged independently from one another;
    a control board connected to each of the two or more energy storage units and operable for controlling an operational status of each of the two or more energy storage units and of selectively cycling each of the two or more energy storage units between an inactive state, an active-discharging state, where at least a first portion of the energy being discharged is provided for use by a load outside of the apparatus, and an active-recharging state; and
    at least one sensor configured to monitor at least one of the following measured values: total remaining charge in each of the two or more energy storage units, the percentage of full charge remaining in each of the of the two or more energy storage units, the temperature of each of the two or more energy storage units, the amperage of each of the two or more energy storage units, the voltage of each of the two or more energy storage units, and a malfunction in the apparatus, and wherein the sensor is configured to return a sensed value to the control board as a signal;
    wherein the control board is programmed to, at a first time period, set the first energy storage unit to the active-discharging state and the second energy storage unit to the active-recharging state, wherein a second portion of the energy being discharged from the first energy storage unit is delivered to and recharges the second energy storage unit; to receive the signal from the at least one sensor; and, at a second time period following the first time period, automatically in response to the signal at the control board sent from the at least one sensor determining whether the signal has reached a preprogrammed set point, and cycling the charging state of the first and second energy storage units when the preprogrammed set point is reached to different charging states according to a looping pattern.

2. The apparatus of claim 1 wherein the two or more energy storage units includes a third energy storage unit set to the inactive charging state at the first time period.

3. The apparatus of claim 1 wherein the looping pattern is manually programmed.

4. The apparatus of claim 1 wherein the apparatus control board without manual input automatically determines the looping pattern.

5. The apparatus of claim 1 wherein the control board cycles each of the energy sources from the active-discharge state directly to the active-recharge state.

6. The apparatus of claim 1 wherein the control board is programmed so that the looping pattern includes a cool off period and cycles each of the energy sources to the inactive state for at least one cycle between transitioning from the active-discharge state to the active-recharge state or vice versa.

7. The apparatus of claim 1, wherein when the apparatus control board detects a malfunctioning energy source, the looping pattern is automatically altered by the control board to remove the malfunctioning energy source from the looping pattern.

8. The apparatus of claim 1, wherein the looping pattern is automatically updated by the control board depending on the sensed values or the load.

9. The apparatus of claim 1, wherein, in response to a signal indicating that the temperature of one of the two or more energy storage units has reached a preprogrammed set point, the apparatus control board automatically includes a cool off period in the looping pattern, where each of the energy sources is cycled to the inactive state for at least one cycle between transitioning from the active-discharge state to the active-recharge state or vice versa.

10. The apparatus of claim 1 wherein each of the two or more energy storage units comprises a battery or a capacitor.

11. A method of providing energy with an energy cycling apparatus, the method comprising the following steps:
  a. providing two or more energy storage units, including at least a first energy storage unit and a second energy storage unit, each of the two or more storage units connected to a ground and capable of being activated, deactivated, discharged and recharged independently from one another;
  b. providing a control board connected to each of the two or more energy storage units and operable for controlling an operational status of each of the two or more energy storage units and of selectively cycling each of the two or more energy storage units between a plurality of charging states consisting of an inactive state, an active-discharging state, where at least a first portion of the energy being discharged is provided for use by a load outside of the apparatus, and an active-recharging state; and
  c. providing at least one sensor configured to monitor at least one of the following sensed values: total remaining charge in each of the two or more energy storage units, the percentage of full charge remaining in each of the of the two or more energy storage units, the temperature of each of the two or more energy storage units, the amperage of each of the two or more energy storage units, the voltage of each of the two or more energy storage units, and a malfunction in the apparatus, and wherein the sensor is configured to return the sensed value to the control board as a signal;
  d. configuring the control board with a preprogrammed set point for at least one of the sensed values to automatically cycle the two or more energy storage units in response to the signal received from the at least one sensor indicating that the sensed value has reached the preprogrammed set point;
  e. at a first time period, setting the first energy storage unit to the active-discharging state and the second energy storage unit to the active-recharging state, wherein a second portion of the energy being discharged from the first energy storage unit is delivered to and recharges the second energy storage unit;
  f. using the at least one sensor to obtain the at least one sensed values;
  g. receiving a signal at the control board a signal sent from the at least one sensor indicating that the at least one sensed values has reached the preprogrammed set point;
  h. at a second time period following the first time period and after receiving the signal, automatically in response to the signal, cycling the charging state of the first and second energy storage units to different charging states according to a looping pattern.

12. The method of providing energy of claim 11 further comprising the step of providing a third energy storage unit set to the inactive charging state at the first time period.

13. The method of claim 11, wherein the looping pattern is manually programmed.

14. The method of claim 11, wherein the apparatus control board automatically determines the looping pattern.

15. The method of claim 11, wherein the looping pattern cycles each of the energy sources from the active-discharge state directly to the active-recharge state.

16. The method of claim 11, wherein the looping pattern includes a cool off period and cycles each of the energy sources to the inactive state for at least one cycle between transitioning from the active-discharge state to the active-recharge state or vice versa.

17. The method of claim 11, wherein when the control board apparatus detects a malfunctioning energy source, the looping pattern is automatically altered to remove the malfunctioning energy source.

18. The method of claim 11, wherein the looping pattern is automatically updated depending on the sensed values or the load.

19. The method of claim 11, wherein, in response to a signal indicating that the temperature of one of the two or more energy storage units has reached the preprogrammed set point, the control board apparatus automatically includes a cool off period in the looping pattern, where each of the energy sources is cycled to the inactive state for at least one cycle between transitioning from the active-discharge state to the active-recharge state or vice versa.

20. The method of claim 11 wherein each of the two or more energy storage units comprise a battery or a capacitor.

* * * * *